(12) United States Patent
Breeden et al.

(10) Patent No.: US 9,327,564 B2
(45) Date of Patent: May 3, 2016

(54) HITCH BALL MOUNT

(75) Inventors: Winston Breeden, Chagrin Falls, OH (US); Thaddeus T. Brej, Rocky River, OH (US)

(73) Assignee: Winston Products LLC, Cleveland, OH (US)

( * ) Notice: Subject to any disclaimer, the term of this patent is extended or adjusted under 35 U.S.C. 154(b) by 582 days.

(21) Appl. No.: 13/024,366

(22) Filed: Feb. 10, 2011

(65) Prior Publication Data

US 2011/0193321 A1    Aug. 11, 2011

Related U.S. Application Data

(60) Provisional application No. 61/303,070, filed on Feb. 10, 2010, provisional application No. 61/370,550, filed on Aug. 4, 2010.

(51) Int. Cl.
*B60D 1/06* (2006.01)
*B60D 1/52* (2006.01)
*B60D 1/155* (2006.01)

(52) U.S. Cl.
CPC .. *B60D 1/06* (2013.01); *B60D 1/52* (2013.01); *B60D 1/155* (2013.01)

(58) Field of Classification Search
CPC ............ B60D 1/06; B60D 1/155; B60D 1/52; F16B 7/10
USPC ......... 248/125.8, 157; 52/651.07, 651.1, 843, 52/726, 731.3, 736.1, 726.2; D12/106, D12/408, 741.1, 653.2, 655.1, 726.1; 280/511, 491.2, 491.5, 506
See application file for complete search history.

(56) References Cited

U.S. PATENT DOCUMENTS

| | | | |
|---|---|---|---|
| 910,192 A * | 1/1909 | Arquembourg et al. | 138/38 |
| 2,848,253 A | 8/1958 | Walker | |
| 2,872,213 A | 2/1959 | Hosford | |
| 3,370,389 A * | 2/1968 | Macaluso | 52/239 |
| 3,547,475 A * | 12/1970 | Gingher | 403/297 |
| 3,972,638 A * | 8/1976 | Vivoli | 403/174 |
| 4,076,432 A * | 2/1978 | Glaser | 403/176 |
| 4,570,408 A * | 2/1986 | Frascaroli et al. | 52/843 |
| 4,773,668 A | 9/1988 | Muonro | |
| 5,333,888 A * | 8/1994 | Ball | 280/504 |
| D369,581 S | 5/1996 | McCoy et al. | |
| D369,582 S | 5/1996 | McCoy et al. | |
| D397,067 S | 8/1998 | McCoy et al. | |
| 5,873,594 A | 2/1999 | McCoy et al. | |
| 6,010,142 A | 1/2000 | McCoy et al. | |
| D431,216 S * | 9/2000 | Belinky | D12/162 |
| 6,139,043 A | 10/2000 | Gries et al. | |
| 6,186,531 B1 | 2/2001 | Parent | |

(Continued)

*Primary Examiner* — Anne Marie Boehler
(74) *Attorney, Agent, or Firm* — Cooper Legal Group, LLC

(57) ABSTRACT

A hitch device for a trailer mount is provided. The hitch device includes a mounting portion, a receiver sleeve receiving the mounting portion, wherein the receiver sleeve includes a cross-section having a quadrilateral shape. In one aspect, the mounting portion includes a plurality of walls, wherein each of the walls projects towards internal corners of the receiver sleeve. In another aspect, the walls includes a concave portion and a convex portion. In yet another aspect, a center distance between each of first center portions of a first pair of opposing walls is less than an edge distance between each of two first edge portions, and a second center distance between each of second center portions of a second pair of opposing walls is less than a second edge distance between each of two second edge portions.

7 Claims, 4 Drawing Sheets

(56) References Cited

U.S. PATENT DOCUMENTS

| | | |
|---|---|---|
| 6,276,111 B1 * | 8/2001 | Pittman et al. ............... 52/741.1 |
| 6,511,086 B2 * | 1/2003 | Schlicht ........................ 280/166 |
| D475,327 S | 6/2003 | McCoy et al. |
| D519,065 S | 4/2006 | Tambornino |
| D530,652 S | 10/2006 | Tambornino |
| D537,759 S | 3/2007 | Tambornino |
| 7,195,269 B2 | 3/2007 | Tambornino |
| 7,448,640 B2 * | 11/2008 | Weaver ......................... 280/507 |
| 7,766,202 B2 * | 8/2010 | Depot .......................... 224/504 |
| 2002/0140206 A1 | 10/2002 | Lloyd |
| 2004/0007852 A1 * | 1/2004 | Tambornino .............. 280/491.2 |
| 2005/0173893 A1 | 8/2005 | Buckley et al. |
| 2010/0133785 A1 * | 6/2010 | McCoy ...................... 280/490.1 |

* cited by examiner

HITCH BALL MOUNT

CROSS-REFERENCE TO RELATED APPLICATIONS

This application claims priority to U.S. Provisional Patent Application No. 61/303,070, entitled "Hitch Mount Ball," filed Feb. 10, 2010 and this application also claims priority to U.S. Provisional Patent Application No. 61/370,550, entitled "Hitch Mount Ball," filed Aug. 4, 2010, both of which are expressly incorporated herein by reference for all purposes.

FIELD OF THE INVENTION

The present invention relates generally to a trailer hitch assembly for towing an object.

BACKGROUND OF THE INVENTION

A trailer hitch assembly can be used to attach a towed object, such as a trailer, to a towing object, such as vehicle in the form of a truck, an automobile, a recreational vehicle, or the like. The trailer hitch assembly can include a receiving portion and a mounting portion. The receiving portion can be attached to one object, such as the towing object, and the mounting portion can be attached to the other object, such as the towed object. The mounting portion can be removably attached to the receiving portion, allowing the towing object to tow the towed object. One example of such removable attachment is via a portion of the mounting portion being inserted into the receiving portion and being secured therein via a pin or the like.

The towed object can have a relatively large weight. Such a relatively large weight requires a sufficiently strong trailer hitch assembly. Typically, the approach has been to use large, heavy components within a trailer hitch assembly to provide sufficient strength. Of course, heavy components may have a disadvantage. Weight of the components may be a disadvantage. Also, such heavy components typically have an associated large amount material (e.g., metal).

Also, within one example, the receiving portion has an opening for receiving a segment of the mounting portion. The opening is typically square in cross-section and the segment of the mounting portion has a corresponding cross-sectional shape (e.g., square cross-section). The segment of the mounting portion typically fits into the opening with minimal clearance. As such, dirt, rust or other material within the opening and/or upon the segment of the mounting portion may provide some impedance to insertion due to friction.

Accordingly, it would be useful to provide a mounting portion that can provide reduced weight, reduced material use and reduced friction impedance, and also provide strength.

BRIEF SUMMARY OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a hitch device for a trailer mount. The hitch device includes a mounting portion and a receiver sleeve configured to receive the mounting portion. The receiver sleeve includes a cross-section having a quadrilateral shape with internal corners. The mounting portion includes a plurality of walls, wherein each of the walls is configured to project towards internal corners of the receiver sleeve. Each of the walls includes a center portion, wherein each of the center portions is configured to project towards a midpoint location of the mounting portion.

In accordance with another aspect, the present invention provides a hitch device for a trailer mount. The hitch device includes a receiver sleeve, wherein the receiver sleeve includes a cross-section having a quadrilateral shape, and a mounting portion configured to be received by the receiver sleeve. The mounting portion includes a plurality of walls defining an axial recess extending along a length of the mounting portion, wherein each of the walls includes a concave portion and a convex portion In accordance with another aspect, the present invention provides a hitch device for a trailer mount. The hitch device includes a receiver sleeve, wherein the receiver sleeve includes a cross-section having a quadrilateral shape, and a mounting portion configured to be received by the receiver sleeve. The mounting portion includes a first pair of opposing walls, wherein each of the first pair of opposing walls includes a first center portion and two first edge portions, a second pair of opposing walls extending between the first pair of opposing walls, wherein each of the second pair of opposing walls includes a second center portion and two second edge portions. A center distance between each of the first center portions of the first pair of opposing walls is less than an edge distance between each of the two first edge portions. A second center distance between each of the second center portions of the second pair of opposing walls is less than a second edge distance between each of the two second edge portions.

BRIEF DESCRIPTION OF THE DRAWINGS

The foregoing and other aspects of the invention will become apparent to those skilled in the art to which the invention relates upon reading the following description with reference to the accompanying drawings, in which.

DESCRIPTION OF EXAMPLE EMBODIMENTS

Figure 1:
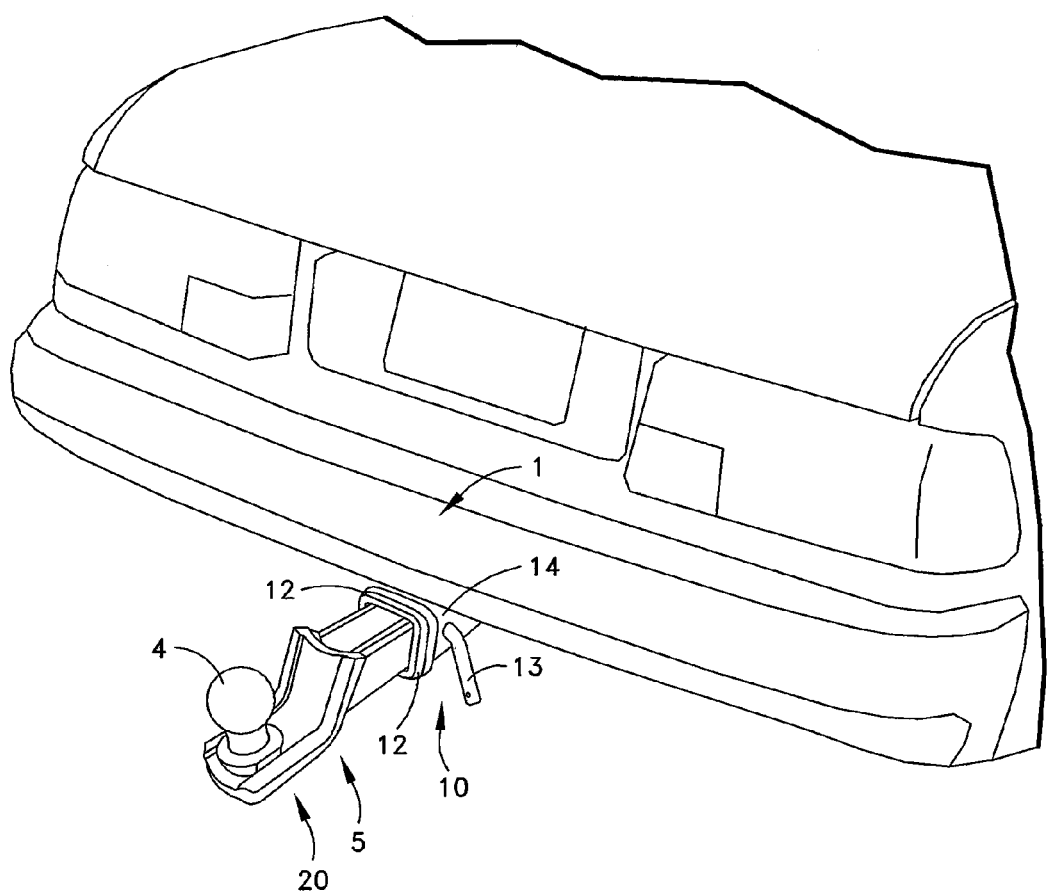
FIG. 1 is a perspective view generically showing a trailer hitch device mounted to a rear portion of an automobile, with the trailer hitch device being generically representative of any of the examples presented herein.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

FIG. 1 illustrates a hitch device 5 according to at least one aspect of the present invention. The hitch device 5 is shown to be mounted to an automobile 1, but can be mounted to a variety of structures, including trucks, recreation vehicles, etc. The hitch device 5 includes a receiver sleeve 10 in association with a mounting portion 20. Within the shown example, the receiver sleeve 10 is attached to the automobile 1. The receiver sleeve 10 can be attached to a rear center, underneath portion of the automobile 1 in a variety of ways, and could be removably attached to the automobile 1. It is to be understood that FIG. 1 merely shows an example and another attachment locations/arrangements are contemplated.

The mounting portion 20 is for coupling to a towed structure at an opposite end from the receiver sleeve 10. One example of a towed structure is a trailer, however a variety of towed structures are contemplated. For ease of reference, any of such towed structures can be referred to herein as simply a trailer.

A hitch ball 4 can be attached to the mounting portion 20 for engagement with the towed structure. In short summary, the hitch ball 4 can be received within a female portion on a tongue of the trailer and entrapped therein. Thus allowing the trailer to be moved by force transmitted to the trailer tongue via the hitch ball 4.

Figure 2:
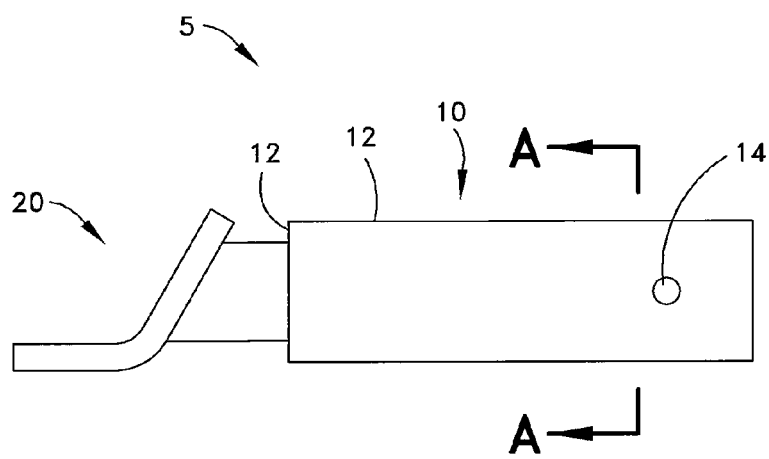
FIG. 2 is a side view of certain portions of the example trailer hitch device of FIG. 1 and generically showing a mounting portion and a receiver portion, which are generically representative of any of the examples presented herein.

Referring now to both FIG. 1 and FIG. 2 (a side view of the mounting portion 20 being received by the receiver sleeve 10), the receiver sleeve 10 is defined by one or more walls 12. In the shown example, the receiver sleeve 10 includes four walls forming a cross-section opening having a quadrilateral shape. In the shown example, the walls 12 can be oriented relative to adjacent walls at 90° angles. In the shown example, the quadrilateral shape of the cross-section is a square. However, other quadrilateral shapes (e.g., rectangles) are possible. The walls 12 may be contiguous (i.e., the walls 12 are formed integrally, such as by bending flat stock) or initially separate pieces attached together (such as by welding). In summary, the walls 12 define an elongated, hollow center portion extending along substantially the entire length of the receiver sleeve 10.

The receiver sleeve 10 can further include a hole 14. While the hole 14 is shown on one wall of the receiver sleeve 10, it is to be understood that the hole 14 can extend through to the opposing wall of the receiver sleeve 10 to define a passageway. It is possible that different/additional hole(s) can be provided along the receiver sleeve 10. An attachment structure 13, such as a pin, screw, rod, bolt, or the like can be inserted through the hole 14. As will be described below, the attachment structure 13 can pass through the hole 14 and engage both the receiver sleeve 10 and the mounting portion 20, such that the mounting portion 20 is held within the receiver sleeve 10. Thus, with the mounting portion 20 held within the receiver sleeve 10 and a trailer connected to the hitch ball 4 attached to the mounting, portion, the trailer can be moved (i.e., towed) by the automobile.

The receiver sleeve 10 is sized to receive the mounting portion 20. It is to be understood that the mounting portion 20 shown in FIG. 2 is shown generically, and can include a variety of different structures, as will be described below. The receiver sleeve 10 can be sized to be slightly larger than the mounting portion 20 to allow ease of insertion.

It is to be appreciated that the receiver sleeve 10 and mounting portion 20 are not limited to the structures described above, and could be attached in reverse. For example, the receiver sleeve 10 could be attached to the trailer while the mounting portion 20 could be attached to the automobile 1.

Figure 3:
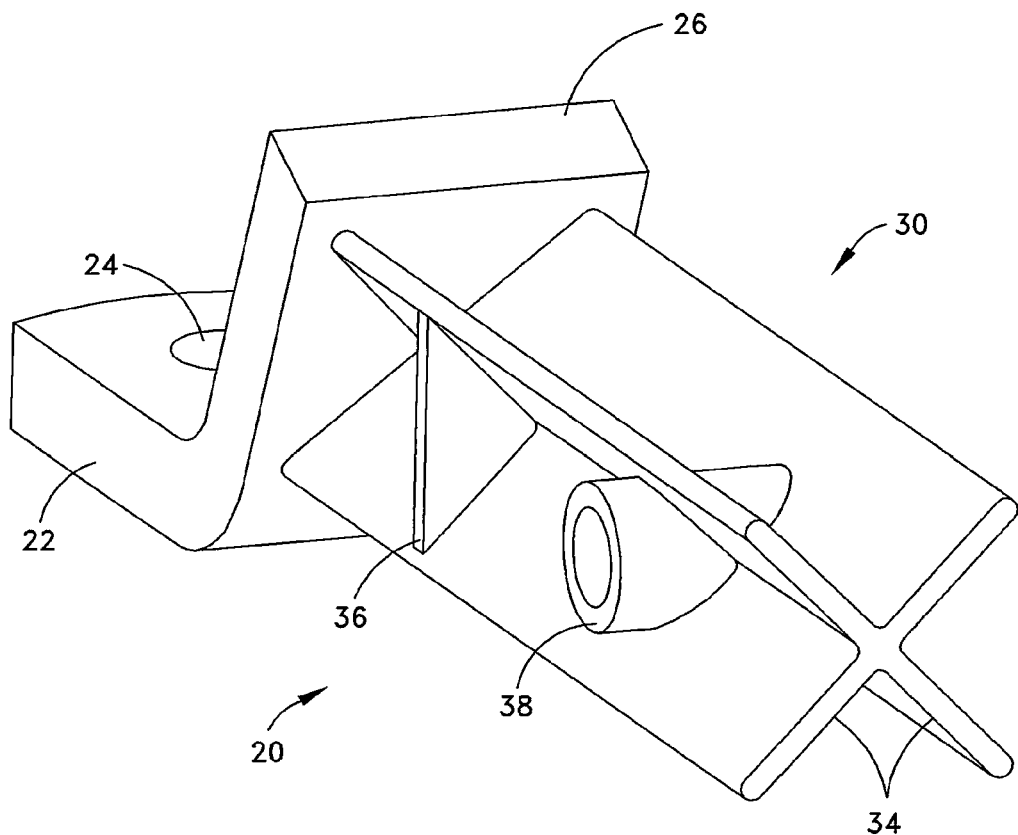
FIG. 3 is a reverse-angle, perspective view of an example mounting portion having an X-shape in accordance with an aspect of the present invention.

Referring now to FIG. 3, a first example of the mounting portion 20 is shown. The mounting portion 20 can include a tongue portion 22 connected to a shaft 30 of the mounting portion 20 via a connecting portion 26. Focusing upon the tongue portion 22, the tongue portion 22 includes a hole 24 extending there through from a top surface to a bottom surface. The hole 24 can be sized to accommodate the hitch ball 4 (shown in FIG. 1), which is secured thereon via a threaded nut or the like, as will be appreciated by the person of ordinary skill in the art. Specifically, in one example, the hitch ball 4 can include a downwardly extending threaded portion that extends through the hole 24. The downwardly extending threaded portion of the hitch ball 4 may extend through the hole 24 and be attached to a threaded nut that can be threaded onto the threaded portion and tightened thereon. It is to be understood that the attachment of the hitch ball 4 within the hole 24 to the tongue portion 22 is not limited to the example described herein because the hitch ball can be attached to the tongue portion via a different manner.

Referring still to FIG. 3, the connecting portion 26 is an upwardly extending (e.g., bent) portion that extends from the tongue portion 22. The connecting portion 26 can be formed integrally with the tongue portion 22 and thus the connecting portion 26 is just the upwardly bend portion. In the alternative, the connecting portion 26 can be a separate piece from the tongue portion 22, and can be attached to the tongue portion 22, such as by welding, or the like. The connecting portion 26 can project upwardly from the tongue portion 22 at a number of angles, and is not limited to the example angle shown in FIG. 3.

The shaft 30 can project outwardly from the connecting portion 26 at a substantially horizontal orientation; however, different orientations are contemplated. The shaft 30 can be attached to the connecting portion 26 in a number of ways, such as by welding. The shaft 30 can include a variety of different shapes and sizes. In the shown example, the shaft 30 includes an X-shaped cross-section formed from a plurality of walls 34. The walls 34 can include two walls that are attached together at a midpoint location, such as by welding, to form the X-shape. In the alternative, the walls 34 can include four walls attached at the midpoint location and projecting outwardly to form the X-shape. The midpoint location can be located at substantially the center of a cross-section of the X-shape. In the shown example, the walls 34 can be separated from each other by 90°; however the walls 34 can be separated by varying angles that still form the X-shape.

The shaft 30 can include one or more stabilizing structure(s) 36 configured to add support to the walls 34. In the shown example, the stabilizing structure 36 includes a wall projecting between the walls 34. It is to be understood, however, that the stabilizing structure 36 can include a variety of structures, such as a plurality of stabilizing structures positioned on some or all sides of the wall 34. Similarly, the stabilizing structure 36 is shown to be positioned closer to the connecting portion 26. However, the stabilizing structure 36 can be positioned at any location along the length of the shaft 30, such that the stabilizing structure 36 could be positioned closer to an end of the shaft 30 opposite from the connecting portion 26.

The shaft 30 can also include a tubular opening 38 extending through the shaft 30. The opening 38 can extend through one or more of the walls 34 such that the opening 38 extends substantially through the midpoint location of the shaft 30. The opening 38 can include a tube, cylinder, or the like that defines the opening 38 to provide additional structural support. Consequently, as shown in FIG. 3, the opening 38 can include the tube passing through the walls 34 and through the midpoint location of the shaft 30 from one side of the shaft 30 to an opposing side of the shaft. When the shaft 30 is inserted into the receiver sleeve 10, the shaft 30 can be slid into the receiver sleeve 10 a sufficient distance such that the opening 38 can align with the hole 14 of the receiver sleeve 10. Together, the hole 14 in the receiver sleeve 10 and the opening 38 in the shaft can define a passage extending through from one of the walls 12 of the receiver sleeve 10, through the shaft, and through an opposing wall on an opposite side of the receiver sleeve 10. Accordingly, the attachment structure 13 i.e., a pin) can pass through the hole 14 in the receiver sleeve 10 and through the opening 38 in the shaft. As such, the attachment structure 13 can hold the shaft 30 in place with respect to the receiver sleeve 10. The opening 38 of the shaft 30 is shown to include a single opening but, in other examples, could include a plurality of openings. Furthermore, the hole 14 of the receiver sleeve 10 could include one hole, or could include a plurality of holes, such that multiple attachment structures 13 can be inserted along the length of the shaft 30 and engage multiple openings 38 and holes 14 for further structural support.

Figure 4:
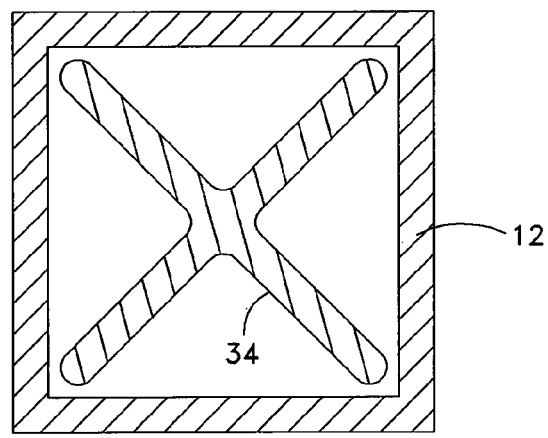
FIG. 4 is a cross-sectional view that would be taken along line A-A of FIG. 2 with the example mounting portion having the X-shape of FIG. 3.

Referring now to FIG. 4, a cross-sectional view of the shaft 30 with the X-shaped cross section is shown within the receiver sleeve 10. The walls 34 of the shaft 30 extend or project toward internal corners of the walls 12 of the receiver sleeve 10. Also, the walls 34 project towards the midpoint location at the center of the shaft 30 of the mounting portion 20 and the receiver sleeve 10. Thus, overall, the walls 34 can project outwardly from the midpoint location towards the internal corners of the walls 12. In the shown example, the walls 34 are shown to come close to the walls 12, but are not shown in contact. It is to be understood, however, that the walls 34 can engage the internal corners of the walls 12 by physically touching them, or, in the alternative, can engage the internal corners of the walls 12 by being in closer physical proximity to the internal corners of the walls 12. Moreover, while the shaft 30 can be attached to the receiver sleeve 10 at the opening 38 and the hole 14, due to shifting of the shaft 30 with respect to the receiver sleeve 10, some walls 34 can come into contact with the internal corners of the walls 12 while others do not physically touch. Edge portions of the walls can engage the internal corners of the walls 12 while center portions of the walls project towards the midpoint location of the shaft 30. Since edge portions and not the center portions of the walls 34 engage the internal corners of the receiver sleeve 10, the friction and resistance between the mounting portion 20 and the receiver sleeve 10 can thereby be reduced.

Thus, the mounting portion 20 is an example of a mounting portion that includes a plurality of walls, wherein each of the walls is configured to project towards one of the internal corners of the receiver sleeve, further wherein each of the walls includes a center portion, wherein each of the center portions is configured to project towards a midpoint location of the mounting portion. Also, the mounting portion 20 is an example of a mounting portion that includes a first pair of opposing walls, wherein each of the first pair of opposing walls includes a first center portion and two first edge portions, and a second pair of opposing walls extending between the first pair of opposing walls, wherein each of the second pair of opposing walls includes a second center portion and two second edge portions, with a center distance between each of the first center portions of the first pair of opposing walls is less than an edge distance between each of the two first edge portions and a second center distance between each of the second center portions of the second pair of opposing walls is less than a second edge distance between each of the two second edge portions.

Figure 5:
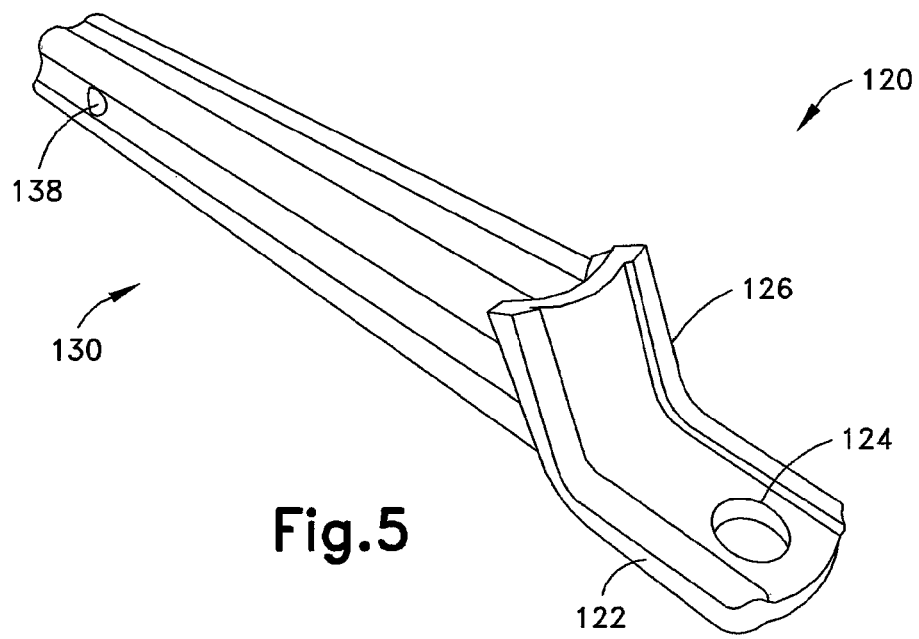
FIG. 5 is a perspective view of a second example mounting portion having an undulated or cloverleaf shape in accordance with an aspect of the present invention.

Referring now to FIG. 5, a second example of a mounting portion 120 is shown. The mounting portion 120 can include a tongue portion 122 connected to a shaft 130. The tongue portion 122 can include a substantially flat portion with a portion that is bent upwardly. The tongue portion 122 can include a hole 124 extending through the tongue portion 122 from atop surface to a bottom surface. The hole 124 can be sized to accommodate the hitch ball 4 that is shown in FIG. 1.

As with the previous example, the hitch ball 4 can be mounted to the tongue portion 122. The hitch ball 4 can include an insertion portion that is sized to be received by the hole 124. The hitch ball 4 and the hole 124 can include a number of structures for attaching the hitch ball 4 to the tongue portion 122. As described above, the hitch ball 4 can include a downwardly extending threaded portion that extends through the hole 124. The downwardly extending threaded portion of the hitch ball 4 may extend through the hole 124 and be attached to a threaded nut that can be threaded onto the threaded portion and tightened thereon. It is to be understood that the attachment of the hitch ball 4 within the hole 124 to the tongue portion 122 is not limited to the examples described herein. Once the hitch ball 4 is attached to the tongue portion 122, the hitch ball 4 can be received within a ball receiver on a trailer or other vehicle to be towed.

Referring still to FIG. 5, the tongue portion 122 can further include a connecting portion 126 that is bent upwardly from the tongue portion 122. The connecting portion 126 can be formed integrally with the tongue portion 122, such as by bending the connecting portion 126. In the alternative, the connecting portion 126 can be a separate piece from the tongue portion 122, and can be attached to the tongue portion 122, such as by welding, or the like. The connecting portion 126 can project upwardly from the tongue portion 122 at a number of angles, and is not limited to the example in FIG. 5. The shaft 130 can project outwardly from the connecting portion 126 at a substantially horizontal angle. The shaft 130 can be attached to the connecting portion 26 in a number of ways, such as by welding.

Figure 6:
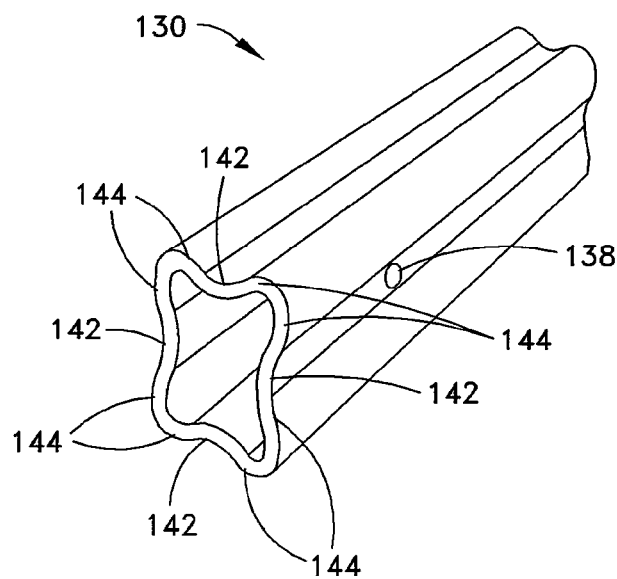
FIG. 6 is an reverse-angle perspective view of just the portion having the undulated or cloverleaf in accordance with an aspect of the present invention.

Referring to FIGS. 5 and 6, the shaft 130 can also include an opening 138 extending through the shaft 130. The opening 138 can extend through one or more of the walls of the shaft 130 such that the opening 138 extends substantially through a midpoint location of the shaft 130. The opening 138 is shown to include two holes in the walls of the shaft 130, however, the opening 138 could include a tube, cylinder, or the like that extends between opposing holes, through the center of the shaft 130 to provide additional structural support. When the shaft 130 is inserted into the receiver sleeve 10, the shaft 130 can be slid into the receiver sleeve 10 a sufficient distance such that the opening 138 can align with the hole 14 of the receiver sleeve 10. Together, the hole 14 in the receiver sleeve 10 and the opening 138 in the shaft can define a passage extending through from one of the walls of the receiver sleeve 10, through the shaft 130, and through an opposing wall on an opposite side of the receiver sleeve 10. Accordingly, the attachment structure 13 (e.g., a pin) can pass through the hole 14 in the receiver sleeve 10 and through the opening 138 in the shaft 130. As such, the attachment structure 13 can hold the shaft 130 in place with respect to the receiver sleeve 10. The opening 138 of the shaft 130 is shown to include a single opening, but, in other examples, could include a plurality of openings. Furthermore, the hole 14 of the receiver sleeve 10 could include one hole, or could include a plurality of holes, such that multiple attachment structures 13 can be inserted along the length of the shaft 130 and engage multiple openings 138 and holes 14 for further structural support. The opening 138 can be created at any step of the forming process of the shaft 130, and can be created by either cutting, stamping, drilling, etc.

Referring now to FIG. 6, the shaft 130 can include a variety of different shapes and sizes. In the shown example, the shaft 130 includes a cloverleaf shaped cross-section, with four lobes, formed from a plurality of walls. The cloverleaf shaped cross-section can include undulations that provide concavities and convexities formed in the walls to define the four lobes. As is shown within FIGS. 5-7, the cross-section, shaped as undulated lobes, is without the presence of non-arcuate segments so as to be smoothly arcuate through-out the cross-section. The walls can include a first pair of opposing walls and a second pair of opposing walls that define the cloverleaf shaped cross-section and define an axial recess extending within the shaft 130 and along the length of the shaft 130. Each wall includes a center portion 142 and two edge portions 144 positioned on opposing sides of the center portion 142. The center portion 142 of each wall can extend towards a midpoint location of the shaft 130 of the mounting portion 120. The midpoint location can be located at substantially the center of a cross-section of the cloverleaf shape of the shaft 130. The edge portions 144 can extend towards the internal corners of the walls 12 of the receiver sleeve 10. As such, a center distance can separate the center portions 142 of opposing walls. Similarly, an edge distance can separate the edge portions 144 of the opposing walls. Since the center portions 142 of opposing walls are closer together than edge portions 144 of opposing walls, the center distance can be less than the edge distance.

Figure 7:
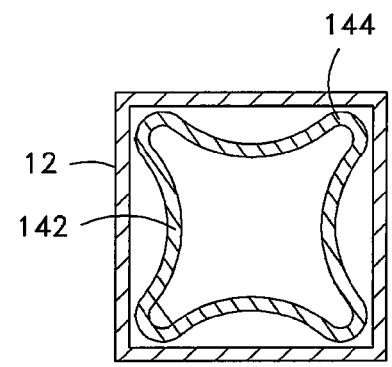
FIG. 7 is a cross-sectional view that would be taken along line A-A of FIG. 2 with the second example mounting portion having the undulated or cloverleaf shape.

Referring now to FIG. 7, a cross-sectional view of the shaft 130 with the cloverleaf shaped cross section is shown with the receiver sleeve. The walls of the shaft 130 project towards and engage internal corners of the walls 12 of the receiver sleeve 10. More specifically, the edge portions 144 of the opposing walls can each engage the internal corners of the walls 12 of the receiver sleeve 10. The center portions 142 of each of the walls of the shaft 130 can project towards the midpoint location at the center of the shaft 130 and may not engage the walls 12 of the receiver sleeve 10. In the shown example, the edge portions 144 of the walls are shown to come close to the walls 12, but are not shown in contact. It is to be understood, however, that the edge portions 144 can engage the internal corners of the walls 12 by physically touching them, or, in the alternative, can engage the internal corners of the walls 12 by being in close physical proximity to the internal corners of the walls 12. Moreover, while the shaft 130 can be attached to the receiver sleeve 10 at the opening 138 and the hole 14, due to shifting of the shaft 130 with respect to the receiver sleeve 10, some edge portions 144 of the shaft 130 can come into contact with the internal corners of the walls 12 while others do not physically touch. In other words, the edge portions 144, with the rounded surfaces, are adapted to engage respective corner regions of the tubular portion of the receiver sleeve 10 and intermediate adjacent edge portions 142 are adapted to be spaced from walls 12 of the tubular portion of the receiver sleeve. Since edge portions 144 and not the center portions 142 of the walls engage the internal corners of the receiver sleeve 10, the friction and resistance between the mounting portion 20 and the receiver sleeve 10 can thereby be reduced. Moreover, the undulated lobes, which are without the presence of non-arcuate segments so as to be smoothly arcuate through-out the cross-section, help provide the reduction in friction and resistance via the specific engagement discussed above. So one aspect of the present invention is a trailer hitch mount for connection to a receiver attached to a vehicle. The receiver includes a tubular portion formed from a first tube having a rectangular cross-section with a first internal size. The trailer hitch mount includes a tongue portion that has a planar surface with an opening for mounting a hitch ball. The trailer hitch mount includes a mounting portion fixed to the tongue portion and extending in a direction essentially parallel to the planar surface of the tongue portion. The mounting portion is adapted to be received in the tubular portion of the receiver. The mounting portion includes a tubular portion formed from a second tube having a cross-section with a second external size smaller than the first internal size. The cross-section is shaped as undulated lobes without the presence of non-arcuate segments so as to be smoothly arcuate through-out the cross-section, and which has edge portions with rounded surfaces adapted to engage respective corner regions of the tubular portion of the receiver and a portion intermediate adjacent edge portions adapted to be spaced from walls of the tubular portion of the receiver. As some ancillary aspects, the following are to be appreciated. The edge portions can extend the entire length of the mounting portion. The intermediate portion can be defined by a curved surface extending the length of the mounting portion. The receiver sleeve can include a hole and the mounting portion can include an opening, further wherein an attachment structure is configured to pass through the hole and the opening to attach the receiver sleeve to the mounting portion. The mounting portion can include four edge portions. The mounting portion can include four intermediate portions. The tubular portion of the mounting portion can have a cloverleaf shaped cross-section.

The shaft 130 can be formed in a number of ways. For instance, the shaft 130 may be made of portions that are separately made and then joined together. For instance, each of the four walls can be separately made including cutting, forming, bending, etc. After being made, the four walls can be joined together, such as by welding or any other method to secure the walls together. In further examples, the shaft 130 can be formed as a single element. In another example, the shaft 130 may be formed of a solid material, such that no axial recess is formed in the shaft. The size and configuration of the shaft 130 can be varied. For instance, in further examples, the center portion 142 can project further or less inward towards the center midpoint location of the shaft 130 than in the shown examples. Further, while not shown in the examples, the shaft 130 can include one or more reinforcing structures, such as gussets, plates, tubes, sheets, etc., that can add strength and durability to the ball mount. For instance, the reinforcing structures can be positioned anywhere within the axial recess extending along the shaft 130.

Thus, the mounting portion 120 is an example of a mounting portion that includes a plurality of walls, wherein each of the walls is configured to project towards one of the internal corners of the receiver sleeve, further wherein each of the walls includes a center portion, wherein each of the center portions is configured to project towards a midpoint location of the mounting portion. Also, the mounting portion 120 is an example of a mounting portion that includes plurality of walls defining an axial recess extending along a length of the mounting portion, wherein each of the walls includes a concave portion and a convex portion. Still further, the mounting portion 120 is an example of a mounting portion that includes a first pair of opposing walls, wherein each of the first pair of opposing walls includes a first center portion and two first edge portions, and a second pair of opposing walls extending between the first pair of opposing walls, wherein each of the second pair of opposing walls includes a second center portion and two second edge portions, with a center distance between each of the first center portions of the first pair of opposing walls is less than an edge distance between each of the two first edge portions and a second center distance between each of the second center portions of the second pair of opposing walls is less than a second edge distance between each of the two second edge portions.

Figure 8:
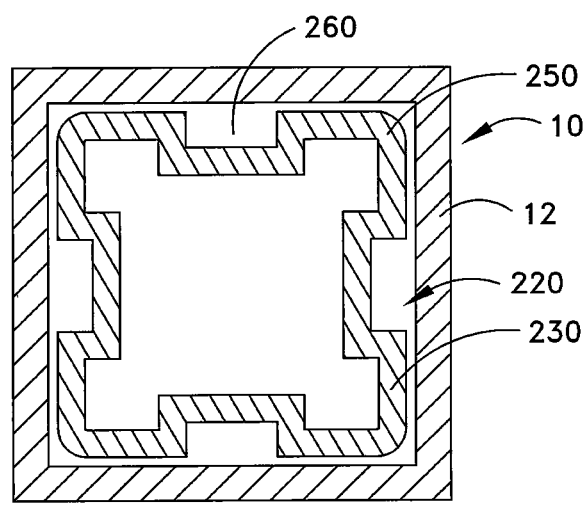
FIG. 8 is a cross-sectional view that would be taken along line A-A of FIG. 2 with yet another example mounting portion.

Referring now to FIG. 8, a third example of a shaft 230 of a mounting portion 220 is shown within the walls 12 of the receiver sleeve 10. The mounting portion 220 can include a tongue portion connected to the shaft 230 and for mounting a hitch ball similar to the previous examples. Also, the shaft may have an opening to receive a pin similar to the previous examples.

In the shown example of FIG. 8, the shaft 230 includes a plurality of walls that are configured to have lobes 250 projecting to corners of the walls 12 of the receiver sleeve 10. The walls of the shaft 230 have recesses 260 that are located on the walls intermediate the lobes 250. Thus, the cross-section can show the concavities and convexities formed in the walls. It should be noted that although some of the surface segment may not be smoothly actuate (e.g., abrupt direction change), the inventive properties are still present. Moreover, the presence of arcuate/non-arcuate segments may be varied.

In general, the walls of the shaft 230 can include a first pair of opposing walls and a second pair of opposing walls that define the cross-section shape and define an axial recess extending therein. Each wall includes a center portion and two edge portions positioned on opposing sides of the center portion. The center portion of each wall can extend towards a midpoint location of the shaft 230 of the mounting portion 220. The midpoint location can be located at substantially the center of a cross-section of the shape of the shaft 230. The edge portions can extend towards the internal corners of the walls 12 of the receiver sleeve 10. As such, a center distance can separate the center portions of opposing walls. Similarly, an edge distance can separate the edge portions of the opposing walls. Since the center portions of opposing walls are closer together than edge portions of opposing walls, the center distance can be less than the edge distance.

Also, the walls of the shaft 230 project towards and engage internal corners of the walls 12 of the receiver sleeve 10. More specifically, the edge portions of the opposing walls can each engage the internal corners of the walls 12 of the receiver sleeve 10. The center portions of each of the walls of the shaft 230 can project towards the midpoint location at the center of the shaft 230 and may not engage the walls 12 of the receiver sleeve 10. In the shown example, the edge portions of the walls are shown to come close to the walls 12, but are not shown in contact. It is to be understood, however, that the edge portions can engage the internal corners of the walls 12 by physically touching them, or, in the alternative, can engage the internal corners of the walls 12 by being in close physical proximity to the internal corners of the walls 12. Friction and resistance between the mounting portion and the receiver sleeve can thereby be reduced.

The shaft 230 can be formed in a number of ways. For instance, the shaft 230 may be made of portions that are separately made and then joined together. For instance, each of the four walls can be separately made including cutting, forming, bending, etc., and then joined together, such as by welding or any other method to secure the walls together. In further examples, the shaft 230 can be formed as a single element. In another example, the shaft 230 may be formed of a solid material, such that no axial recess is formed in the shaft. The size and configuration of the shaft 230 can be varied.

Thus, the mounting portion 220 is an example of a mounting portion that includes a plurality of walls, wherein each of the walls is configured to project towards one of the internal corners of the receiver sleeve, further wherein each of the walls includes a center portion, wherein each of the center portions is configured to project towards a midpoint location of the mounting portion. Also, the mounting portion 220 is an example of a mounting portion that includes plurality of walls defining an axial recess extending along a length of the mounting portion, wherein each of the walls includes a concave portion and a convex portion. Still further, the mounting portion 220 is an example of a mounting portion that includes a first pair of opposing walls, wherein each of the first pair of opposing walls includes a first center portion and two first edge portions, and a second pair of opposing walls extending between the first pair of opposing walls, wherein each of the second pair of opposing walls includes a second center portion and two second edge portions, with a center distance between each of the first center portions of the first pair of opposing walls is less than an edge distance between each of the two first edge portions and a second center distance between each of the second center portions of the second pair of opposing walls is less than a second edge distance between each of the two second edge portions.

Each shaft 30, 130, 230 described herein can maintain the strength and durability of a ball mount while decreasing the volume, weight, engagement surface area, material, and manufacturing costs. Furthermore, any of the structures described herein, including the shaft 30, 130, 230 can be formed from a number of different materials, including aluminum, steel, a combination of materials, etc.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A trailer hitch mount for connection to a receiver attached to a vehicle, the receiver includes a tubular portion formed from a first tube having a rectangular cross-section with a first internal size, the trailer hitch mount including:
   a tongue portion having a planar surface with an opening for mounting a hitch ball; and
   a mounting portion fixed to the tongue portion and extending in a direction essentially parallel to the planar surface of the tongue portion, the mounting portion adapted to be received in the tubular portion of the receiver and wherein the mounting portion includes a tubular portion formed from a second tube having a cross-section with a second external size smaller than the first internal size, with the cross-section shaped as undulated lobes without the presence of non-arcuate segments so as to be smoothly arcuate through-out the cross-section, and having edge portions with rounded surfaces adapted to engage respective corner regions of the tubular portion of the receiver and a portion intermediate adjacent edge portions adapted to be spaced from walls of the tubular portion of the receiver.

2. The trailer hitch mount of claim 1 wherein the edge portions extend the entire length of the mounting portion.

3. The trailer hitch mount of claim 1 wherein the intermediate portion is defined by a curved surface extending the length of the mounting portion.

4. The trailer hitch mount of claim 1 wherein the receiver sleeve includes a hole and the mounting portion includes an opening, further wherein an attachment structure is configured to pass through the hole and the opening to attach the receiver sleeve to the mounting portion.

5. The trailer hitch mount of claim 1 wherein the mounting portion includes four edge portions.

6. The trailer hitch mount of claim 1 wherein the mounting portion includes four intermediate portions.

7. The trailer hitch mount of claim 1 wherein the tubular portion of the mounting portion has a cloverleaf shaped cross-section.

\* \* \* \* \*